United States Patent Office 3,126,418
Patented Mar. 24, 1964

3,126,418
PURIFICATION OF NITROCYCLOHEXANE
John H. Bonfield, East Aurora, N.Y., assignor to Allied Chemical Corporation, New York, N.Y., a corporation of New York
No Drawing. Filed Aug. 13, 1962, Ser. No. 216,313
5 Claims. (Cl. 260—644)

This invention relates to the purification of nitrocyclohexane. More particularly, it relates to the purification of nitrocyclohexane by converting the crude nitrocyclohexane to the ammonium salt of aci-nitrocyclohexane and regenerating purified nitrocyclohexane from the ammonium salt.

Nitrocyclohexane is prepared by the nitration of cyclohexane. As obtained from such a process the product is highly colored, being associated with a number of by-products such as cyclohexyl nitrite, adipic acid, cyclohexyl ethers and the like. Inasmuch as many of these associated impurities, although present in relatively minute quantities, are known to have undesirable effects when present during the subsequent processing of the nitrocyclohexane their removal in an efficient and economical manner is highly desirable. The accomplishment of this end by known procedures, many of which involve the application of heat to the thermally sensitive, explosive, crude nitrocyclohexane mixture, leaves much to be desired in both efficiency and practicality.

It is therefore a principal object of this invention to devise an efficient and practical process for the purification of nitrocyclohexane.

Another object is to separate nitrocyclohexane in an improved manner from chromogenic by-products arising from the nitration of cyclohexane.

Other objects and advantages thereof will be apparent from the following description of the present invention.

I have now made a surprising discovery that nitrocyclohexane can be efficiently, simply and economically separated from its associated impurities, especially those arising from the nitration of cyclohexane, by dissolving nitrocyclohexane in a liquid ammonia medium; allowing time for the precipitation of the ammonium salt of aci-nitrocyclohexane; separating the ammonium salt of aci-nitrocyclohexane from the liquid ammonia phase; and allowing the salt to decompose at ambient temperatures or by heating it, preferably in aqueous solutions, thereby regenerating nitrocyclohexane which is recovered in purified condition.

My process depends for its operation in part upon my findings that: (1) the impurities usually associated with nitrocyclohexane are soluble in liquid ammonia whereas the ammonium salt of aci-nitrocyclohexane is insoluble; (2) a minimum time of about 3 minutes is required at about 25° C. to precipitate the ammonium salt in yields of at least about 50%, with substantially longer periods especially at lower temperatures, from about 10 to about 60 minutes, producing yields of 90–100%; and (3) the ammonium salt of aci-nitrocyclohexane, unlike the corresponding alkali metal salts, is relatively unstable, and decomposes spontaneously or upon heating to nitrocyclohexane rather than to cyclohexanone. Thus, in my process the crude nitrocyclohexane is dissolved in liquid ammonia and after allowing time for the formation and precipitation of the ammonium salt of aci-nitrocyclohexane as a solid, the salt is separated from the liquid ammonia solution of the impurities. Thereafter, the salt, preferably after dissolution in water, is maintained at temperatures at which it decomposes, suitably but not necessarily under gentle heating, yielding purified nitrocyclohexane and ammonia. The nitrocyclohexane is recovered e.g. by decantation, steam distillation or other means.

The quantity of liquid ammonia used is not critical; except that at least sufficient liquid ammonia should be used to convert a substantial proportion of the nitrocyclohexane to the aci-nitrocyclohexane ammonium salt and provide a sufficient excess to form a fluid slurry which can be readily handled. Suitably, the liquid ammonia amounts to at least twice and preferably three times the weight of the crude nitrocyclohexane used. Instead of using excess ammonia alone to form the slurry, the liquid ammonia can be diluted with a suitable solvent such as acetone, which is miscible with the ammonia, but which is a non-solvent for the ammonium salt of aci-nitrocyclohexane, forming a liquid ammonia medium in which the aci-nitrocyclohexane ammonium salt will precipitate.

Decomposition of the salt can be effected by heating the salt as such, conveniently to about 25° to 50° C. or more, with resultant liberation of ammonia and nitrocyclohexane. However, this method lacks the advantage of removing water soluble impurities from the nitrocyclohexane, as results when the salt is decomposed in aqueous medium as is preferred.

The ammonium salt of aci-nitrocyclohexane decomposes in the presence of acids to cyclohexanone. It is therefore essential to the success of my procedure that acids, and especially strong mineral acids, be substantially excluded from the environment during the decomposition of the ammonium salt. Accordingly, the pH in aqueous decomposition reaction mixture should be not below a minimum of about 4, preferably at least 6. Strong alkalis should also be absent since these would tend to form stable alkali metal salts of aci-nitrocyclohexane; thus the maximum pH of aqueous decomposition reaction mixtures should be not above 12, preferably the water used to dissolve the ammonium salt will have initial pH of about 6–7.5, i.e. will be essentially neutral.

Nitrocyclohexane of satisfactory purity can be recovered by simple decantation from the aqeous ammonia layer resulting from the decomposition in aqueous medium. If highly purified nitrocyclohexane is desired, it can be obtained by steam distillation from the aqueous medium in which the ammonium salt has been decomposed. In such a procedure, it will be observed that ammonia distills first and may be recovered in a known manner, followed by a nitrocyclohexane/water fraction. This fraction is collected and the phases are separated, suitably in continuous fashion. The nitrocyclohexane is run to storage, while the water phase may be returned to the distilling mass in the usual manner or discarded, as desired.

In accordance with a preferred mode of carrying out the process of my invention, crude nitrocyclohexane is dissolved in liquid ammonia using about 3 parts by weight of ammonia per part of the nitrocyclohexane. The temperature is preferably about −35° C., although higher temperatures can be used provided the mass is maintained under suitable pressures to prevent the rapid evaporation of the liquid ammonia. The solution is agitated for about ¼ to 1 hour, or for shorter times e.g. 10 minutes at higher temperatures than −35° C. to permit substantially complete conversion of the nitrocyclohexane to the ammonium salt of aci-nitrocyclohexane and then the resultant slurry is filtered or centrifuged to separate the salt from the liquid ammonia solution of impurities. The filter cake of ammonium aci-nitrocyclohexane is washed with liquid ammonia to displace the motor liquor which contains the associated impurities and is somewhat colored compared to the substantially colorless solid ammonium salt. The washed cake then is dissolved in water to about 10% to about 50% concentration by weight and the reaction mixture is heated to a temperature in the range upward from room temperature to the boiling point, thereby effecting decomposition of the ammonium salt. When decomposition is essentialy complete, as shown by cessation of ammonia evolution and separation of the nitrocyclohexane layer the nitrocyclohexane is recovered as a water-white liquid by decantation from the ammoniacal liquor. If desired, the decanted product can be further purified by distillation, although in most instances the product is obtained in satisfactorily pure condition without further processing.

The following example sets forth completely a specific embodiment of my invention representative of the best mode known to me of carrying out my invention, but is not intended to be limiting. Parts and percentages are by weight and temperatures are in degrees centigrade in the example.

*Example*

Crude nitrocyclohexane prepared by nitration of cyclohexane, which was a brownish liquid containing 78.8% of nitrocyclohexane, was dissolved in three times its weight of liquid ammonia at $-35°$ C. and the mixture was agitated for about 45 minutes. The resultant slurry was filtered and the filter cake was washed with liquid ammonia until the washings were substantially free from color. The white solid ammonium salt of aci-nitrocyclohexane, thus obtained, was dissolved in about 2½ to 3 times its weight of water (i.e. at concentration of about 30–40%) at 25°, the water used being essentially neutral. The solution was gently warmed to about 50° until the separation of regenerated nitrocyclohexane was complete. The mixture was permitted to settle for about 1 hour after which time the lower layer of nitrocyclohexane, water-white in color, was separated by decantation. The nitrocyclohexane thus obtained distilled at 83°/10 mm. in better than 99% recovery, and showed a purity of about 99.9%; as determined by vapor phase chromatography.

The original liquid ammonia mother liquor was dark red brown in color indicating that the impurities which imparted color to the crude nitrocyclohexane were soluble in the liquid ammonia mother liquor, and had been separated therein.

It can thus be seen that an efficient and conveniently operated process for the purification of nitrocyclohexane has been devised. The scope of this invention is not to be limited by the details of this purely illustrative example since it will be obvious to those skilled in this art that modifications thereof are possible.

I claim:

1. The process for purifying nitrocyclohexane which comprises dissolving nitrocyclohexane in a liquid ammonia medium, allowing time for the precipitation of the ammonium salt of aci-nitrocyclohexane, separating the salt phase from the liquid ammonia phase, and allowing the salt to decompose thereby regenerating nitrocyclohexane which is recovered.

2. The process of claim 1 in which crude nitrocyclohexane is dissolved in about 2 to 3 parts by weight liquid ammonia at about $-35°$ C.; the resulting ammonium salt of aci-nitrocyclohexane separated from the solution of dissolved impurities is decomposed in aqueous solution at initial concentration between about 10% to 50% by weight and initial pH 6.0–7.5, and at temperatures between about 25° C. and the boiling point of the reaction mixture; and the resulting nitrocyclohexane layer is separated from the aqueous ammoniacal layer.

3. The process for purifying nitrocyclohexane which comprises dissolving nitrocyclohexane in about 2 to 3 parts by weight of liquid ammonia at about $-35°$ C.; agitating the mixture for about ¼ to 1 hour with resulting precipitation of the ammonium salt of aci-nitrocyclohexane, separating the salt from the solution of dissolved impurities; dissolving the salt in water of initial pH about 6–7.5 at a concentration of about 30% to 40% by weight; maintaining the resulting aqueous reaction mixture at temperatures between about 25° C. and 50° C.; and separating the resulting nitrocyclohexane layer from the aqueous layer.

4. The process of claim 3 in which the nitrocyclohexane is separated from chromogenic by-products arising from the nitration of cyclohexane.

5. The process of claim 3 in which the nitrocyclohexane is separated from the aqueous ammoniacal layer by decantation.

References Cited in the file of this patent

Smiley: J. Org. Chem. 23, 1115–17, 1958 (QD 241.J6).